United States Patent
Ko

(10) Patent No.: US 11,754,198 B2
(45) Date of Patent: Sep. 12, 2023

(54) LEAKAGE BLOCKING DEVICE OF A VALVE

(71) Applicant: Ki Chang Ko, Gimpo-si (KR)

(72) Inventor: Ki Chang Ko, Gimpo-si (KR)

( * ) Notice: Subject to any disclaimer, the term of this patent is extended or adjusted under 35 U.S.C. 154(b) by 0 days.

(21) Appl. No.: 17/912,722

(22) PCT Filed: Sep. 7, 2020

(86) PCT No.: PCT/KR2020/012009
§ 371 (c)(1),
(2) Date: Sep. 19, 2022

(87) PCT Pub. No.: WO2021/187692
PCT Pub. Date: Sep. 23, 2021

(65) Prior Publication Data
US 2023/0175609 A1    Jun. 8, 2023

(30) Foreign Application Priority Data

Mar. 20, 2020   (KR) .................. 10-2020-0034634

(51) Int. Cl.
*F16K 41/00*   (2006.01)

(52) U.S. Cl.
CPC ................... *F16K 41/003* (2013.01)

(58) Field of Classification Search
CPC .................................................. F16K 41/003
USPC ......................................................... 251/214
See application file for complete search history.

(56) References Cited

U.S. PATENT DOCUMENTS

| | | |
|---|---|---|
| 5,979,483 A | 11/1999 | Zapalac |
| 6,161,835 A | 12/2000 | Arbuckle |
| 10,359,113 B2 * | 7/2019 | Bergamini ............... F16J 15/46 |

FOREIGN PATENT DOCUMENTS

| | | | |
|---|---|---|---|
| GB | 817426 A | * | 7/1959 |
| JP | 2006-234171 A | | 9/2006 |
| KR | 10-2007-0078761 A | | 8/2007 |
| KR | 10-2014-0083576 A | | 7/2014 |

OTHER PUBLICATIONS

International Search Report for PCT/KR2020/012009 dated Nov. 17, 2020 (PCT/ISA/210).

* cited by examiner

*Primary Examiner* — Kevin F Murphy
(74) *Attorney, Agent, or Firm* — Sughrue Mion, PLLC

(57) ABSTRACT

A leakage blocking device of a valve is disclosed. When a fluid flowing in a flow path 11 leaks through a gap between the outer circumferential surface of a valve stem bottom (21) and a bottom guide hole (31), a plug 53 of a piston 50 is pushed into a sealing oil chamber 45 by a pressure P1 of the leaked fluid acting on a bottom pressure acting surface S1 of the piston and pressurizes a sealing oil L in the sealing oil chamber 45 to a pressure P2 higher than the pressure P1 of the leaked fluid, thereby blocking leakage of fluid of the valve.

5 Claims, 6 Drawing Sheets

[Fig. 1]
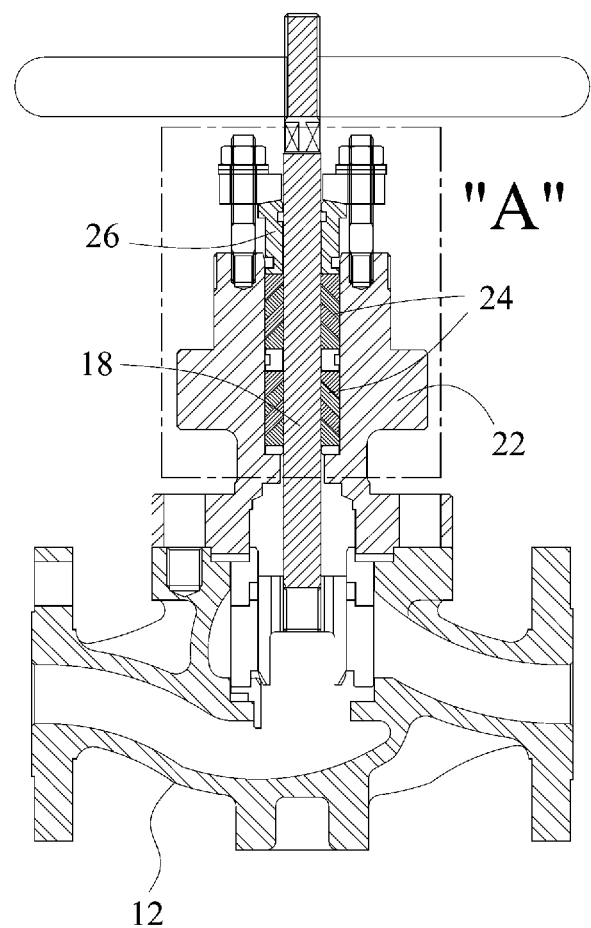

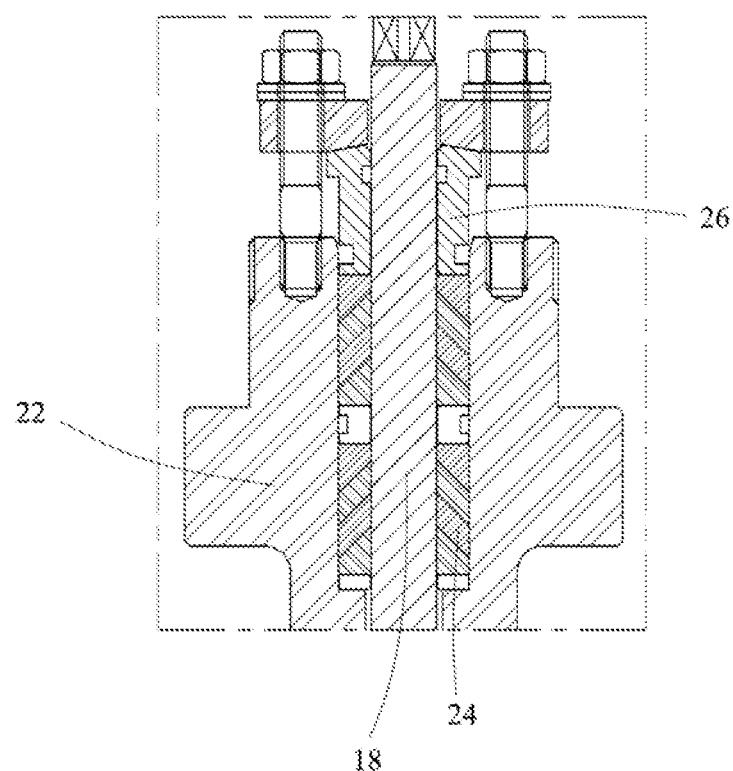
[Fig. 2]

[Fig. 3]
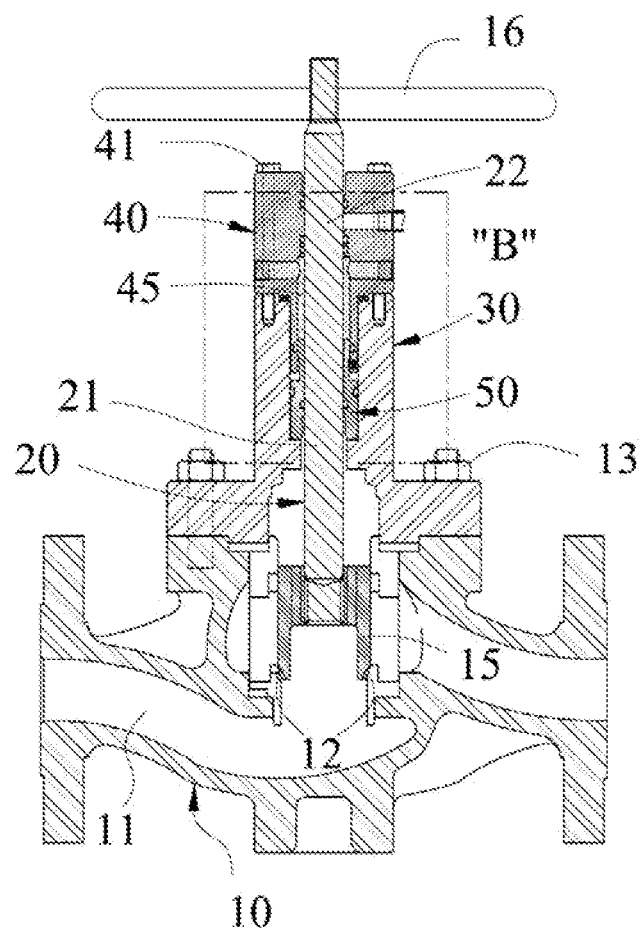

[Fig. 4]
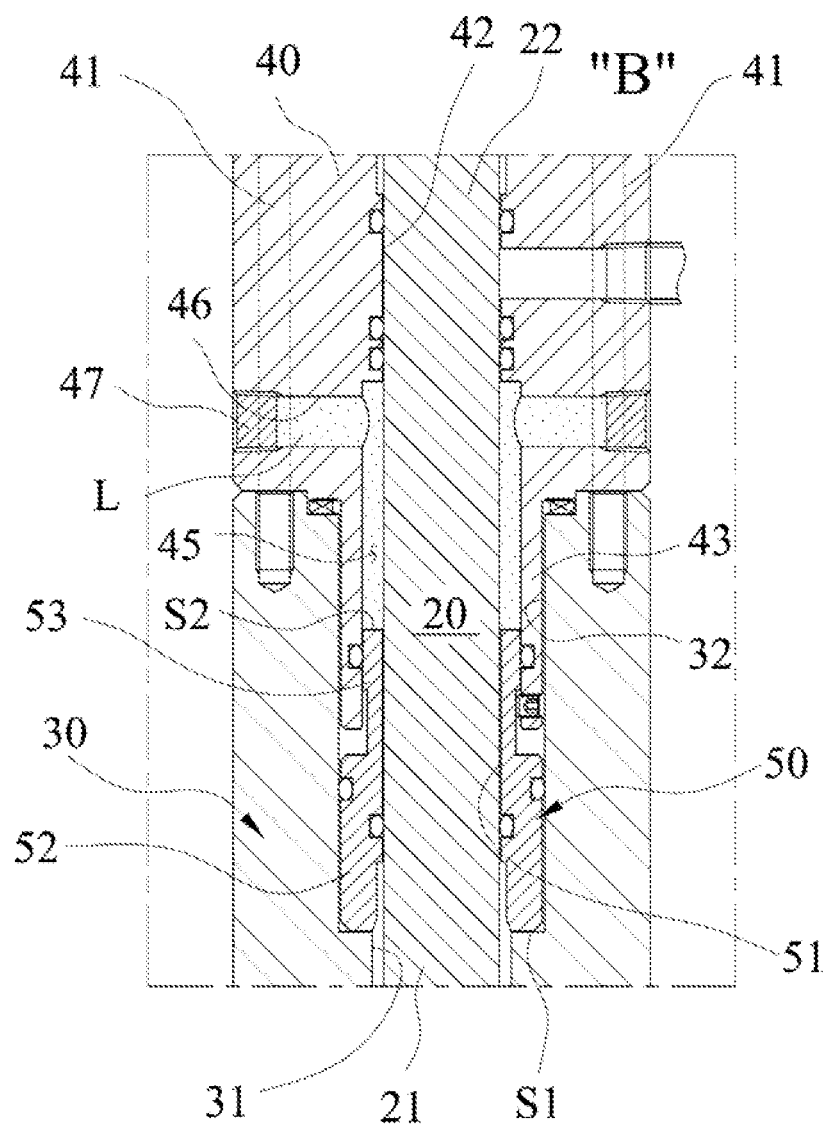

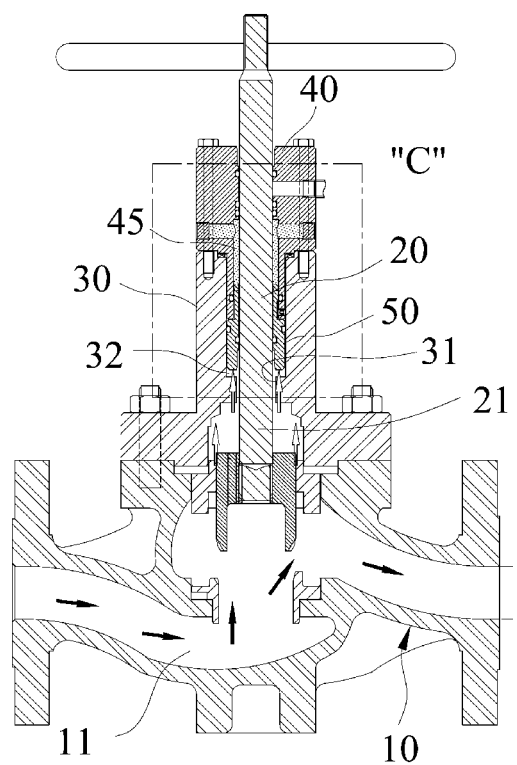
[Fig. 5]

[Fig. 6]
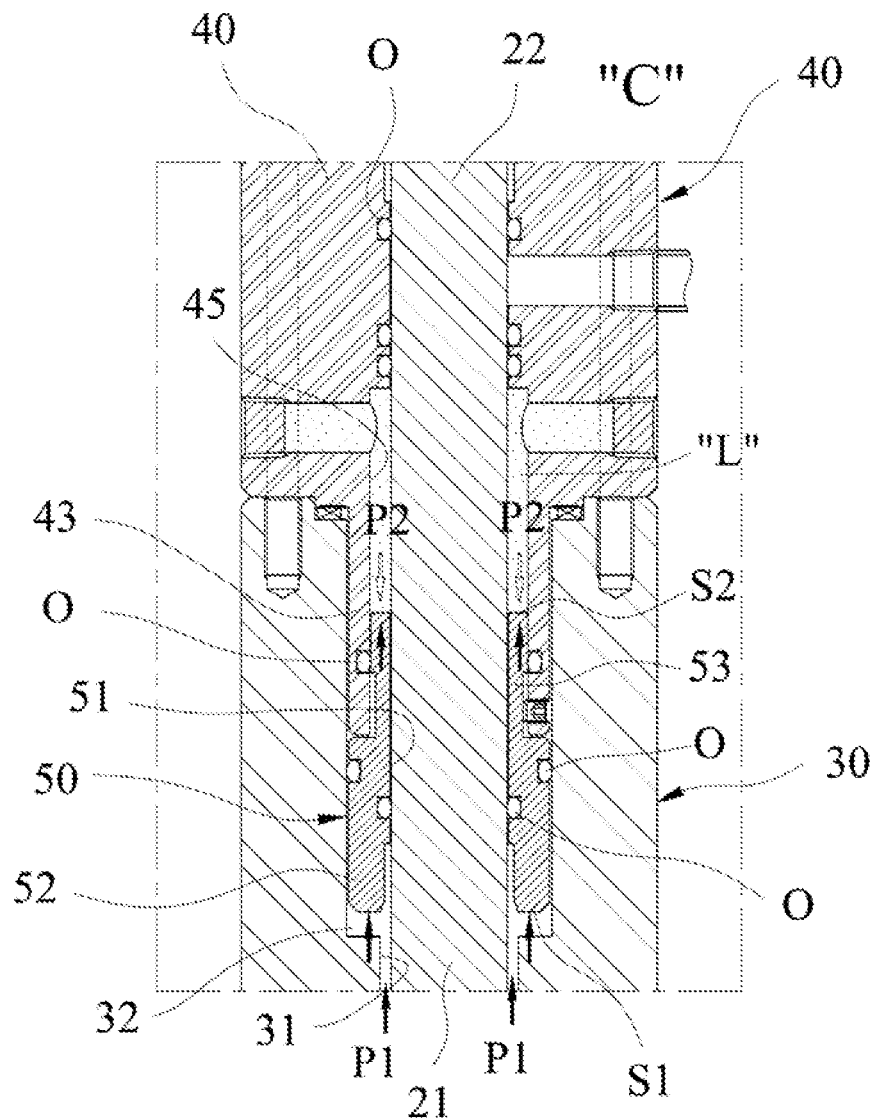

LEAKAGE BLOCKING DEVICE OF A VALVE

CROSS REFERENCE TO RELATED APPLICATIONS

This application is a National Stage of International Application No. PCT/KR2020/012009 filed Sep. 7, 2020, claiming priority based on Korean Patent Application No. 10-2020-0034634 filed Mar. 20, 2020.

TECHNICAL FIELD

The present invention relates to a leakage blocking device of a valve, and particularly, a device capable of effectively blocking leakage of a fluid, which occurs through a gap between an outer circumferential surface of a valve stem and an inner wall surface of a hole in which the valve stem is fitted.

BACKGROUND ART

A fluid control valve for controlling a fluid flow through a pipeline or controlling a flow rate is installed in the pipeline through which the fluid flows. The valve may be, for example, a gate valve, a glove valve, a ball valve, a butterfly valve, and an angle valve.

Examples of a glove valve are disclosed in KR20-0395564 Y1 ('Patent Document 1') and KR10-1197372 ('Patent Document 2'). The valve disclosed in the patent documents 1 and 2 comprises a packing device for preventing leakage of a fluid (a process fluid passing through a pipeline) through a gap between an outer circumferential surface of a valve stem and an inner wall surface of a hole in which the valve stem is fitted. The conventional packing devices disclosed in the patent documents 1 and 2 have a structure in which a sealing member such as a gland packing is used, and the sealing member is pressed and deformed by a pressing means (e.g., gland) to cause frictional contact between the sealing member and the valve stem.

As shown in FIGS. 1 and 2 of Patent Document 1, a valve stem 18 protrudes outwardly from a valve housing 12 and is installed in a packing box 22 so as to pass through an inner space of the packing box 22. A plurality of gland packings 24 made of Teflon or graphite are installed on the outer circumference of the valve stem 18 in the packing box 22 such a manner that they are stacked each other. When the gland packings 24 are pressed, they expand radially and thus they seal off gap between the valve stem 18 and the packing box 22.

In the packing system as described above, edges of the gland packing 24, which is a sealing member, are pressed onto the outer circumferential surface of the valve stem 18 and the inner wall of the packing box 22. Wear occurs on the contact part of the valve stem due to the repeated movement of the valve stem. Leakage of fluid can occur through the worn portion of the valve stem. In case that fluid leakage occurs, there occurs a problem that process should be stopped to replace the worn part with a new one.

In addition, as pressure acting on the gland packing 24 changes, the contact force changes in a portion where the gland packing is closely contacted to seal the gland packing 24, and thus it is difficult to maintain stable sealing.

DISCLOSURE OF INVENTION

Problem to be Solved

An object of the present invention is to provide a leakage blocking device of valve which can effectively block the leakage of fluid without using a sealing member with frictional contact. Another object of the present invention is to provide a leakage blocking device of valve which has a simple structure, easiness to install or repair and excellent durability.

Technical Solution

To achieve the objects mentioned above, a leakage blocking device of a valve according to the present invention for blocking leakage of fluid through an outer circumferential surface of a valve stem comprises:

a bonnet having a lower guide hole in which the valve stem fits to guide a lower part of the valve stem, and a bore coaxially extended from an upper end of the lower guide hole and having a diameter larger than the lower guide hole;

an upper cover covering an upper end of the bore, and having an upper guide hole in which an upper portion of the valve stem slidably fits and a sealing oil chamber filled with pressurized sealing oil and having a diameter smaller than that of the bore of the bonnet and larger than that of the upper guide hole; and a piston comprising a larger diameter portion slidably fitting in the bore of the bonnet at a lower end and a plug slidably fitting in the sealing oil chamber at the upper end thereof, wherein the larger diameter portion has a through-hole for the valve stem to slidably fit therein and a bottom pressure acting surface of a smaller cross-sectional area at a lower end to receive pressure of leaking fluid through a gap between the through-hole and the valve stem, and the plug having a top pressure acting surface of a cross-sectional area smaller than the larger diameter portion.

The upper cover fits in the upper end of the bore of the bonnet, and the sealing oil chamber extends axially to constitute a lower portion of the sealing oil chamber.

Sealing oil is introduced into an inner space through an inlet and filled in the sealing oil chamber, and the inlet is sealed with a cap.

O-rings for blocking fluid leakage may be installed circumferentially on the inner wall of the through-hole of the piston, and on the outer circumferential surface of the larger diameter portion of the piston, and on the inner wall of the upper guide hole of the upper cover, respectively.

When fluid flowing in a pipeline is leaked through a gap between the lower guide hole and the outer circumferential surface of the valve stem, the leaked fluid is introduced into the bore of the bonnet and thus acts on the bottom pressure acting surface of the piston to push the plug of the piston upwardly. As the plug of the piston is pushed upwardly, the pressure of oil in the sealing oil chamber is pressurized and thus increased to a higher pressure than the pressure of the leaked fluid. Accordingly, the fluid leaked from the gap between the lower guide hole and the outer circumferential surface of the valve stem cannot pass through the liquid oil of the sealing chamber having a relatively high pressure, thereby preventing fluid leakage.

Advantageous Effects

According to the leakage blocking device of a valve of the present invention, the piston in the bonnet pressurizes the oil filled in the oil seal chamber by the pressure of the fluid leaked through the valve stem, and the oil pressure in the oil seal chamber is increased to the pressure higher than the pressure of the fluid leaked through the gap, thereby effectively blocking the leakage of the fluid through the valve stem without using a fluid leakage blocking member by frictional contact such as mechanical gland packing.

In addition, the leakage blocking device of a valve of the present invention has excellent durability because the sealing force does not lessen over time.

BRIEF DESCRIPTION OF DRAWINGS

FIG. 1 is a cross-sectional view of a glove valve in which a gland packing device is installed.

FIG. 2 is an enlarged detail view of the 'A' portion of FIG. 1, in which the gland packing device is installed.

FIG. 3 is a longitudinal cross-sectional view of the glove valve in which the leakage blocking device of a valve of the present invention is installed.

FIG. 4 is an enlarged detail view of the 'B' portion of FIG. 3.

FIG. 5 is a longitudinal cross-sectional view of the glove valve where the piston of the leakage blocking device of the present invention moves upwardly in the bore to pressurize the sealing oil of the sealing oil chamber.

FIG. 6 is an enlarged detail view of the 'C' portion of FIG. 5.

MODE FOR INVENTION

Hereinafter, a preferred embodiment of a leakage blocking device of a valve according to the present invention will be described in detail with reference to the accompanying drawings. Although the present embodiment is described with respect to a glove valve, the present invention is not limited to the glove valve and can be applied to other types of valves.

As shown in FIG. 3, a valve assembly comprises a valve body 10 having a flow path 11, a valve seat 12, a valve stem 20 connected to a lower end of the valve disk 15 to move the valve disk 15 to an open position or a closed position, a handle 16 at an upper end thereof; and an upper cover 40 coupled to a top surface of the bonnet 30 with a bolt 41.

As shown in FIGS. 3 and 4, the bonnet 30 comprises a lower guide hole 31 in which the valve stem 20 slidably fits to guide a lower portion 21 of valve stem 20, and a bore 32 coaxially extended from an upper end of the lower guide hole 31 and having a diameter larger than the lower guide hole 31.

The upper cover 40 covering an upper end of the bore 32 comprises an upper guide hole 42 in which an upper portion 22 of the valve stem 20 slidably fits, and a sealing oil chamber 45 filled with pressurized sealing oil L and having a diameter smaller than that of the bore 32 of the bonnet 30 and larger than that of the upper guide hole 42.

The upper cover 40 has a sleeve 43 extending from a bottom surface and slidably fitted in the bore 32 of the bonnet 30. The sleeve 43 forms a lower portion of the sealing oil chamber 45.

The sealing oil L is filled in the sealing oil chamber 45 through an inlet 46, and the inlet 46 of the sealing oil chamber 45 is sealed with a cap 47.

A piston 50 is slidably fitted in the bore 32 of the bonnet 30. The piston 50 has a through-hole 51 in which the valve stem 20 is slidably fitted. The piston 50 comprises a larger diameter portion 52 having a bottom pressure acting surface S1 of a larger cross-sectional area. A pressure P1 of the fluid leaking through a gap between the outer circumferential surface of the valve stem 20 and the inner circumferential surface of the through-hole 51 acts on the bottom pressure acting surface S1 of the larger diameter portion 52.

The piston 50 comprises a plug 53 having a top pressure acting surface S2 of a cross-sectional area smaller than that of the bottom pressure acting surface S1 of the larger diameter portion 52. As shown in FIG. 4, when the piston 50 is slidably fitted in the bore 32 of the bonnet 30, the plug 53 is slidably fitted in the sealing oil chamber 45 of the sleeve 43 of the cover 40.

O-ring is tightly fitted on the inner wall of the through-hole 51 of the piston 50, the outer circumferential surface of the larger diameter portion 52 of the piston 50, and the inner wall of the upper guide hole 42 of the upper cover 40 to block oil leakage.

As shown in FIGS. 5 and 6, when fluid flowing through the flow path 11 is leaked through a gap between the outer circumferential surface of lower portion 21 of the valve stem 20 and the lower guide hole 31 (in the direction of the blanked arrow of FIG. 5), the leaked fluid flows into the bore 32 of the bonnet 30, and acts on the bottom pressure acting surface S1 of the piston 50 with pressure P1.

When the pressure P1 by the leaked fluid acts on the bottom pressure acting surface S1 of the piston 50, the plug 53 of the piston 50 moves upwardly by the pressure P1 and pressurizes the sealing oil L in the sealing oil chamber 45 to a pressure P2 higher than the pressure P1 of the leaked fluid. Since the pressure P1 of the leaked fluid is lower than the pressure P2 of the pressurized sealing oil in the sealing oil chamber 45, the leaked fluid cannot flow into the sealing oil chamber 45 under higher pressure, thereby blocking oil leakage.

In addition, since the leakage blocking device according to the present invention blocks the leakage of the fluid flowing through the valve by the pressure of the sealing oil in the sealing oil chamber 45, the stem packing friction force of the can be significantly reduced compared with the conventional gland packing device.

The stem packing friction force was measured with respect to a valve having a valve stem having a diameter of 25.4 mm, and a conventional V-Teflon packing and a stem packing friction force of graphite packing were measured and are shown in Table 1 below.

TABLE 1

| Item | V-Teflon packing (A) | Graphite Packing (B) | Packing of the present invention (C) |
| --- | --- | --- | --- |
| packing friction force (kgf) | 50 | 250 | 18 |
| packing friction force of present invention/packing friction force of conventional packing structure | C/A = 0.36 | C/B = 0.072 | C/C = 1.0 |

As shown in Table 1, the packing friction force of the packing structure of the present invention is significantly smaller than the packing frictional force of the conventional packing structure. In addition, the packing friction force of the packing structure of the present invention is 36% compared with the conventional packing friction force A of the conventional V-Teflon packing structure, and is only 7.2% compared with the conventional packing friction force B of the conventional graphite packing structure.

The leakage blocking device of a valve according to the present invention can improve the durability of the valve stem by reducing the frictional force between the valve stem and the valve packing. In addition, the leakage blocking device of a valve according to the present invention has a small packing frictional force so that a small amount of force is required for the operation of the valve. Accordingly, the valve having a leakage blocking device according to the present invention can be opened and closed by a small manipulation force, and thus automatic control of valve by electronic control is facilitated.

EXPLANATION OF SYMBOL

| | |
|---|---|
| 10: valve body | 11: flow path |
| 12: valve seat | 13: bolt |
| 15: valve disc | 16: handle |
| 20: valve stem | 21: lower portion of valve stem |
| 22: upper portion of valve stem | 30: bonnet |
| 31: lower guide hole | 32: bore |
| 41: bolt | 40: upper cover |
| 42: upper guide hole | 43: sleeve |
| 46: inlet | 47: cap |
| 45: sealing oil chamber | 50: piston |
| 51: through-hole | 52: larger diameter portion |
| 53: plug | S1: bottom pressure acting surface |
| S2: top pressure acting surface | L: sealing oil |
| O: O-ring | P1: fluid pressure |
| P2: sealing oil pressure | |

What is claimed is:

1. A leakage blocking device of a valve for blocking leakage of fluid through an outer circumferential surface of a valve stem comprises:
    a bonnet (30) having a lower guide hole (31) in which the valve stem (20) slidably fits to guide a lower portion (21) of the valve stem (20), and a bore (32) coaxially extended from an upper end of the lower guide hole (31) and having a diameter larger than the lower guide hole (31);
    an upper cover (40) covering an upper end of the bore (32) and comprising an upper guide hole (42) in which an upper portion (22) of the valve stem (20) slidably fits, and a sealing oil chamber (45) filled with pressurized sealing oil (L) and having a diameter smaller than that of the bore (32) of the bonnet (30) and larger than that of the upper guide hole (42); and
    a piston (50) comprising a larger diameter portion (52) slidably fitting in the bore (32) of the bonnet (30) at a lower end, and a plug (53) slidably fitting in the sealing oil chamber (45) at the upper end thereof, wherein the larger diameter portion (52) has a through-hole (51) for the valve stem (20) to slidably fit therein and a bottom pressure acting surface (S1) of a smaller cross-sectional area at a lower end to receive pressure of leaked fluid through a gap between the through-hole (51) and the valve stem (20), and the plug (53) having a top pressure acting surface (S2) of a cross-sectional area smaller than the larger diameter portion (52).

2. The leakage blocking device of a valve of claim 1, wherein the sealing oil chamber (45) having at least an inlet (46), and the inlet (46) being sealed with a cap (47).

3. The leakage blocking device of a valve of claim 1, wherein the plug (53) of the piston (50) is pushed into the sealing oil chamber (45) by a pressure (P1) of leaked fluid acting on the bottom pressure acting surface (S1) thereof to pressurize the sealing oil (L) in the sealing oil chamber (45) to a pressure (P2) higher than the pressure (P1) of the leaked fluid.

4. The leakage blocking device of a valve of claim 1, wherein the upper cover (40) comprising a sleeve (43) extended downwardly from the bottom thereof and slidably fitted in the upper end of the bore (32) to form a lower portion of the sealing oil chamber (45).

5. The leakage blocking device of a valve of claim 1, wherein an O-ring is installed on an inner wall of the through-hole (51) of the piston (50), an outer circumferential surface of the larger diameter portion (52) of the piston (50), and an inner wall of the upper guide hole (42) of the upper cover (40).

\* \* \* \* \*